United States Patent [19]
Volz et al.

[11] Patent Number: 5,894,180
[45] Date of Patent: Apr. 13, 1999

[54] ELECTRIC MOTOR

[75] Inventors: Peter Volz, Darmstadt; Hans-Dieter Reinartz, Frankfurt; Dieter Dinkel, Eppstein/Ts, all of Germany

[73] Assignee: ITT Manufacturing Enterprises Inc., Wilmington, Del.

[21] Appl. No.: 08/836,146

[22] PCT Filed: Dec. 15, 1995

[86] PCT No.: PCT/EP95/04979

§ 371 Date: Sep. 5, 1997

§ 102(e) Date: Sep. 5, 1997

[87] PCT Pub. No.: WO96/19029

PCT Pub. Date: Jun. 20, 1996

[30] Foreign Application Priority Data

Dec. 15, 1994 [DE] Germany ............... 44 44 643

[51] Int. Cl.⁶ ............................................ H02K 5/10
[52] U.S. Cl. .................... 310/89; 310/88; 417/423.11
[58] Field of Search ......................... 310/89, 88, 87, 310/85; 417/423.14, 423.11

[56] References Cited

FOREIGN PATENT DOCUMENTS

| 600271 | 6/1994 | European Pat. Off. . |
| 682398 | 11/1995 | European Pat. Off. . |
| 866517 | 3/1991 | Germany . |
| 624770 | 11/1992 | Germany . |
| 3247112 | 4/1993 | Germany . |
| 4235962 | 5/1994 | Germany . |
| 4240044 | 6/1994 | Germany . |
| 4315826 | 11/1994 | Germany . |
| WO96/19029 | 6/1996 | WIPO . |

OTHER PUBLICATIONS

English translation of the International Preliminary Examination Report of Application No. PCT/EP95/04979 filed Dec. 15, 1995.
German Patent Application No. G 90 00 324.1 dated Jun. 20, 1991.
German Patent Application No. G 91 07 992.6 dated Mar. 12, 1992.
German Search Report for Application No. P44 44 643.8 dated Jul. 10, 1995.

*Primary Examiner*—Nestor Ramirez
*Assistant Examiner*—B. Mullins
*Attorney, Agent, or Firm*—J. Gordon Lewis; Thomas N. Twomey

[57] ABSTRACT

The application describes an electric motor with a pressure compensation device. This device consists of a BTFE membrane that is arranged in a connecting channel between the interior of the electric motor and the external air.

The membrane is arranged in the shield of the electric motor. Since the shield consists of plastic, the membrane can be sprayed on during the manufacture of the shield such that the membrane is inseparably connected to the shield. However, other fastening methods can be considered. One particularly suitable location for arranging the membrane is a circumferential collar that serves for centering the housing relative to the motor shaft. The connecting channel is realized in the form of a slot on the outer side of the collar. The application also describes additional methods for attaching the membrane.

17 Claims, 6 Drawing Sheets

ELECTRIC MOTOR

TECHNICAL FIELD

The invention pertains to an electric motors and more particularly to vents used to vent motor housings.

BACKGROUND OF THE INVENTION

One example of such an electric motor is described in DE 4,235,962 A1. The invention aims to provide pressure compensation between the interior of the motor housing and the external air in a motor of this type. In this case, it must be taken into account that the motor is used in a vehicle and the motor is subjected to extreme external vibration.

It is known to realize the aforementioned pressure compensation by means of BTFE membranes that are arranged in a connecting channel between the interior of the motor housing and the external air. One example of such an arrangement is described in EP 600,271 A1. The arrangement proposed in this document, however, is not suited to the designated field of application. It should be possible to mount the membranes relatively easily and prevent the membrane from being removed during the operation of the motor due to external influences.

BRIEF DESCRIPTION OF THE DRAWINGS

Each figure shows a cross section through an electric motor/pump unit, with the embodiments shown differing with respect to the arrangement of the ventilation membrane.

DETAILED DESCRIPTION OF THE PREFERRED EMBODIMENTS

Figure 1:
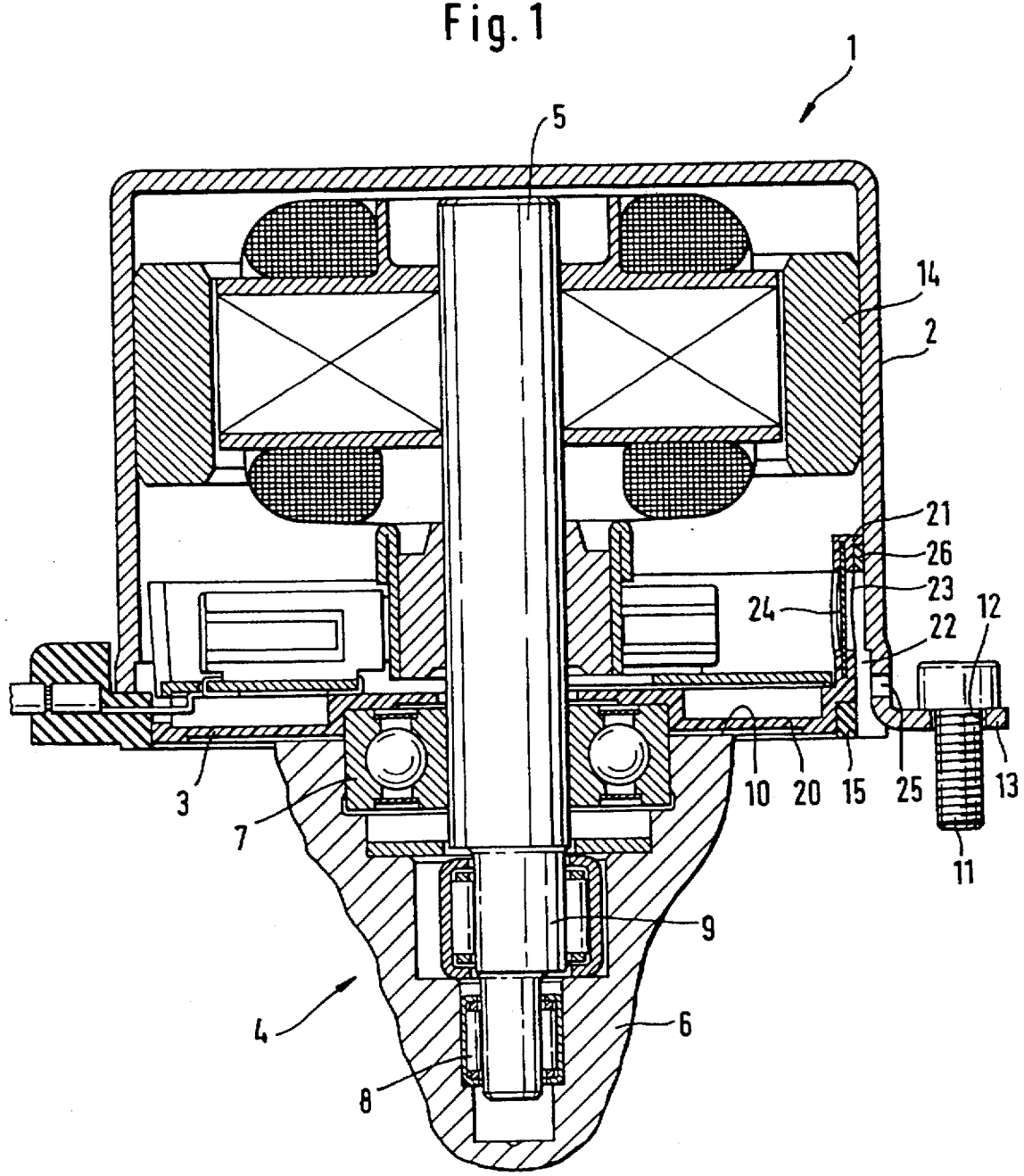
FIG. 1 is a cross-sectional view of a first embodiment of the motor of the present invention having a membrane integrally incorporated into the shield.

The basic design of the motor/pump unit is identical in all figures, i.e., the explicit description of FIG. 1 analogously applies to the following figures.

The electric motor 1 consists of a pot-shaped housing 2, into the open end of which a shield 3 is inserted. A motor shaft 5 is arranged in the axis of the housing 2 and extends out of the electric motor 1 through the shield 3. Magnets 14 are bonded onto the inner side of the housing. The electric motor 1 is connected to a pump 4. The housing 6 of the pump 4 consists of an aluminum block, with bearings 7, 8 that carry the motor shaft 5 arranged in said aluminum block. The pistons of the pump which adjoin a cam region 9 of the motor shaft 5 are not shown in the figures. Electromagnetic valves arranged in the pump housing 6 for controlling the essential that the pump housing 6 has a flat flange surface 10. The electric motor 1 is fastened to the side of the pump housing 6 which comprises the flange surface, i.e., the shield 3 adjoins the flange surface 10. The electric motor is attached by means of screws 11 that extend through openings 12 in a radially outward directed collar 13 on the housing 2 of the electric motor and are screwed into threaded bores in the pump housing 6.

In order to prevent the admission of moisture into the interior of the motor housing as well as the bearing region of the motor shaft, a circumferential seal 15 is arranged between the shield 3 and the edge of the pot-shaped housing 2. The figures show the unstressed condition of the seal 15. In this case, one can ascertain that the seal protrudes beyond the shield 3, i.e., the seal is pressed against the flange surface 10 during the assembly of the electric motor 1 and the pump 4. The previously described sealing function is reliably attained in this fashion.

It was already explained above that it is necessary to form a pressure compensation between the interior of the motor housing 2 and the external air. This pressure compensation is realized in the form of an air exchange. In this case, no moisture can be admitted into the interior of the motor housing. Consequently, filter elements, e.g., BTFE membranes, are arranged in a connecting channel between the interior of the motor and the atmosphere.

According to FIG. 1, the shield 3 consists of an essentially flat plate 20 that extends perpendicular to the motor shaft 5 and comprises a collar 21 that axially extends from the edge of the plate 20 into the interior of the motor housing. The outer edge of this collar adjoins the inner edge of the pot-shaped housing 2. The collar 21 extends almost entirely along the edge of the plate 20 in the circumferential direction. This collar serves for centering the housing 2 relative to the shield 3. Since the shield 3 is supported on the bearing 7 that protrudes out of the pump housing 6, the motor housing 2 is centered relative to the motor shaft 5.

Part of the collar 21 is provided with an axially extending slot 22 that opens radially outward. This slot 22 continues in the circumferential seal 15 that is usually sprayed on the shield 3. A free space or slot 22 consequently extends between the inner wall of the housing 2 and the outer edge of the collar 21. The upper part of this free space is connected to the interior of the motor housing via a circular passage 23. A membrane 24 is arranged in this passage 23. In the embodiment according to FIG. 1, the edge of the membrane 24 is covered by the material of the shield 3 or the collar 21. This means that the membrane 24 is integrally incorporated during the manufacture of the plastic shield.

The slot 22 extends up to the flange surface 10. The additional air exchange takes place via the region between the collar 13 and the flange surface 10, i.e., within the region of the screw 11. This region is not sealed, i.e., a slight air exchange is able to take place.

A ventilation bore 25 may be provided in the cylindrical region of the housing 2 so as to improve the air exchange. In this case, the bore 25 is offset relative to the passage 23 such that no small objects that might be conveyed through the ventilation bore 25 are able to directly impact the membrane 24. In addition, it is very advantageous to locate the head of the screw 11 in front of the ventilation bore 25.

Since the seal formed by the circumferential ring seal 15 is interrupted within the region of the slot 22, the seal 15 is widened in the shape of a U in the axial direction. In this case, the curve 26 of the U extends around the passage 23.

Figure 2:
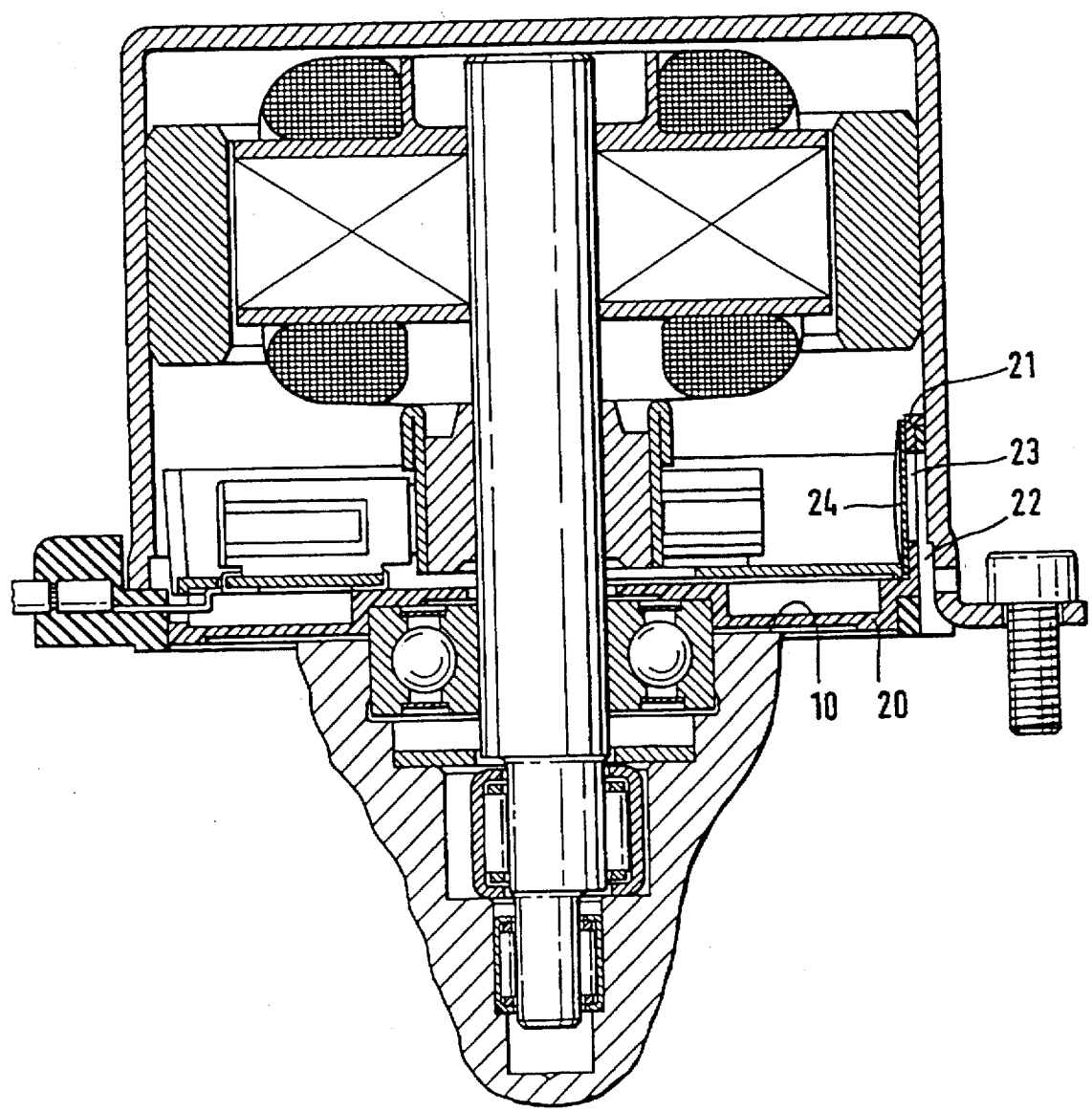
FIG. 2 is a cross-sectional view of a second embodiment of the motor of the present invention having a membrane bonded onto an inner surface of a collar.

Of course, the membrane 24 may also be bonded onto the passage 23 from the inside as shown in FIG. 2.

In other respects, the embodiment according to FIG. 2 corresponds to that shown in FIG. 1.

Figure 3:
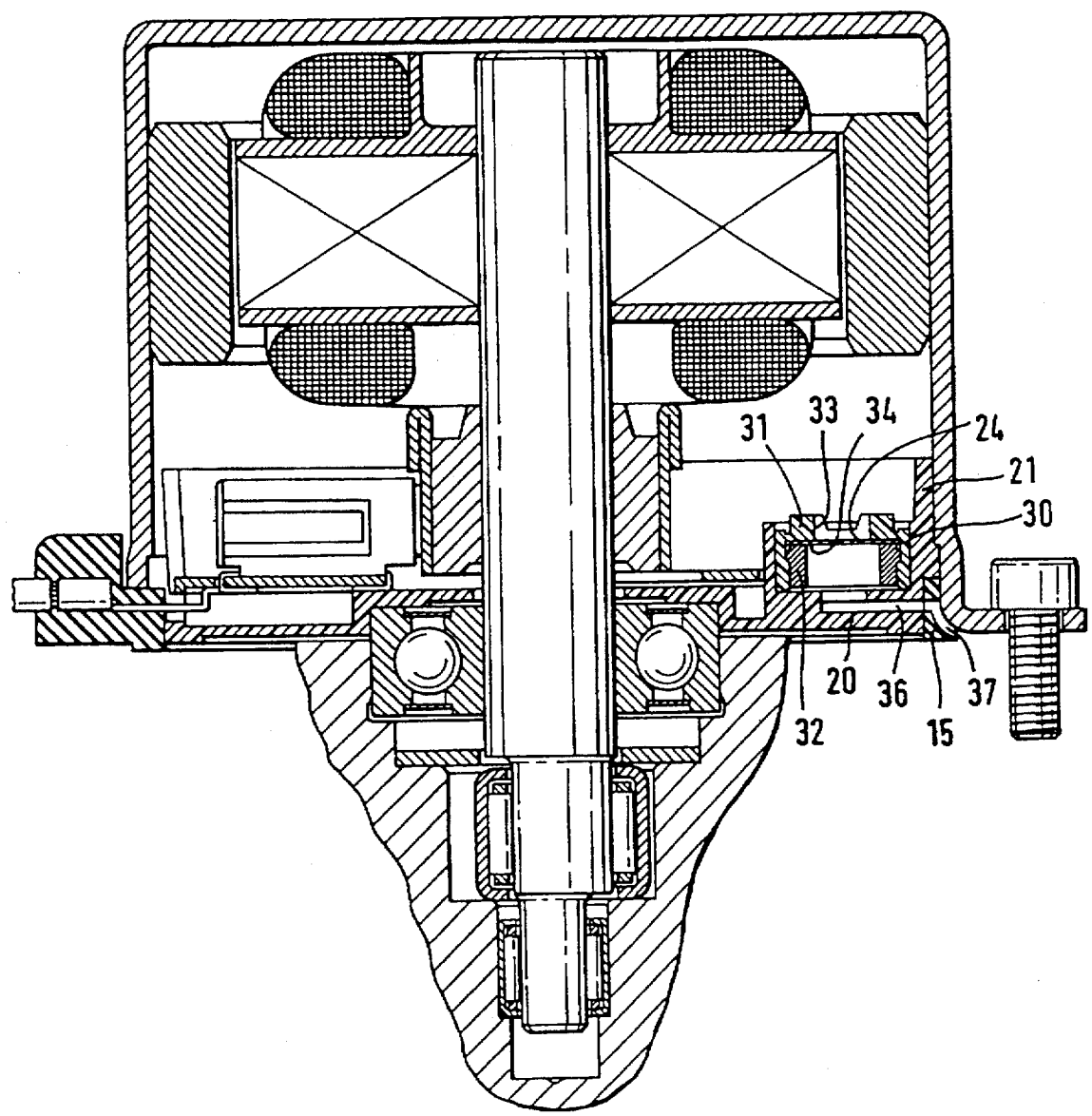
FIG. 3 is a cross-sectional view of a third embodiment of the motor of the present invention wherein a membrane is arranged on a plate.

The embodiment according to FIG. 3 essentially differs from the embodiments described thus far due in that the membrane 24 is not arranged in the collar 21 of the shield 3 but on the plate 20. Consequently, the membrane 24 does not extend axially to the motor shaft 5 but perpendicular thereto.

The fastening method with the aid of a capsule 30 which is shown in FIG. 3 can also be applied to the fastening on the collar 21. In this respect, the following embodiments also apply to the embodiments shown in FIG. 1 and FIG. 2.

The capsule 30 consists of two parts: a receptacle body 31 and a fastening sleeve 32. The receptacle body 31 comprises a central opening 33 with a circumferential edge 34. The outer region of the membrane 24 is placed onto this edge 34. The fastening sleeve 32, one end surface of which is situated opposite to the circumferential edge 34, is now inserted into the receptacle body 31 such that the membrane 24 is clamped between the edge 34 and the end surface of the sleeve 32. The sleeve 32 is held in the receptacle body 31 by means of locking bodies.

The capsule 30 can now be inserted into a corresponding depression in the shield 3. A channel 36 formed during the manufacture of the shield 3 ends in the base of this depression. The channel 36 continues in a channel 37 in the seal 15.

Figure 4:
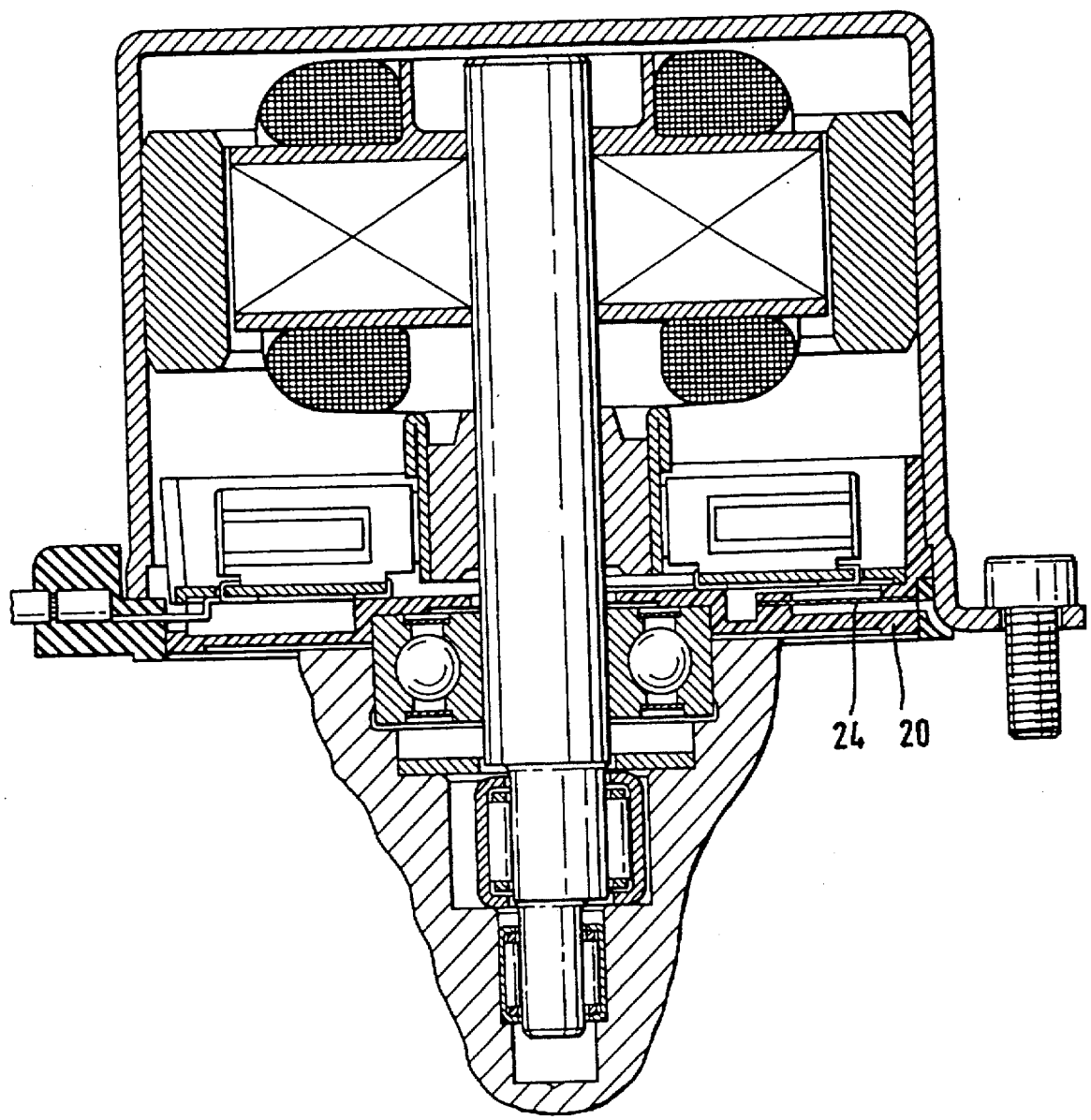
FIG. 4 is a cross-section view of a fourth embodiment of the motor of the present invention wherein a membrane is sprayed onto a plate.

FIG. 4 shows an embodiment in which the membrane 24 is directly sprayed on the plate region 20 of the shield 3. In other respects, the embodiment according to FIG. 4 corresponds to that shown in FIG. 3.

Figure 5:
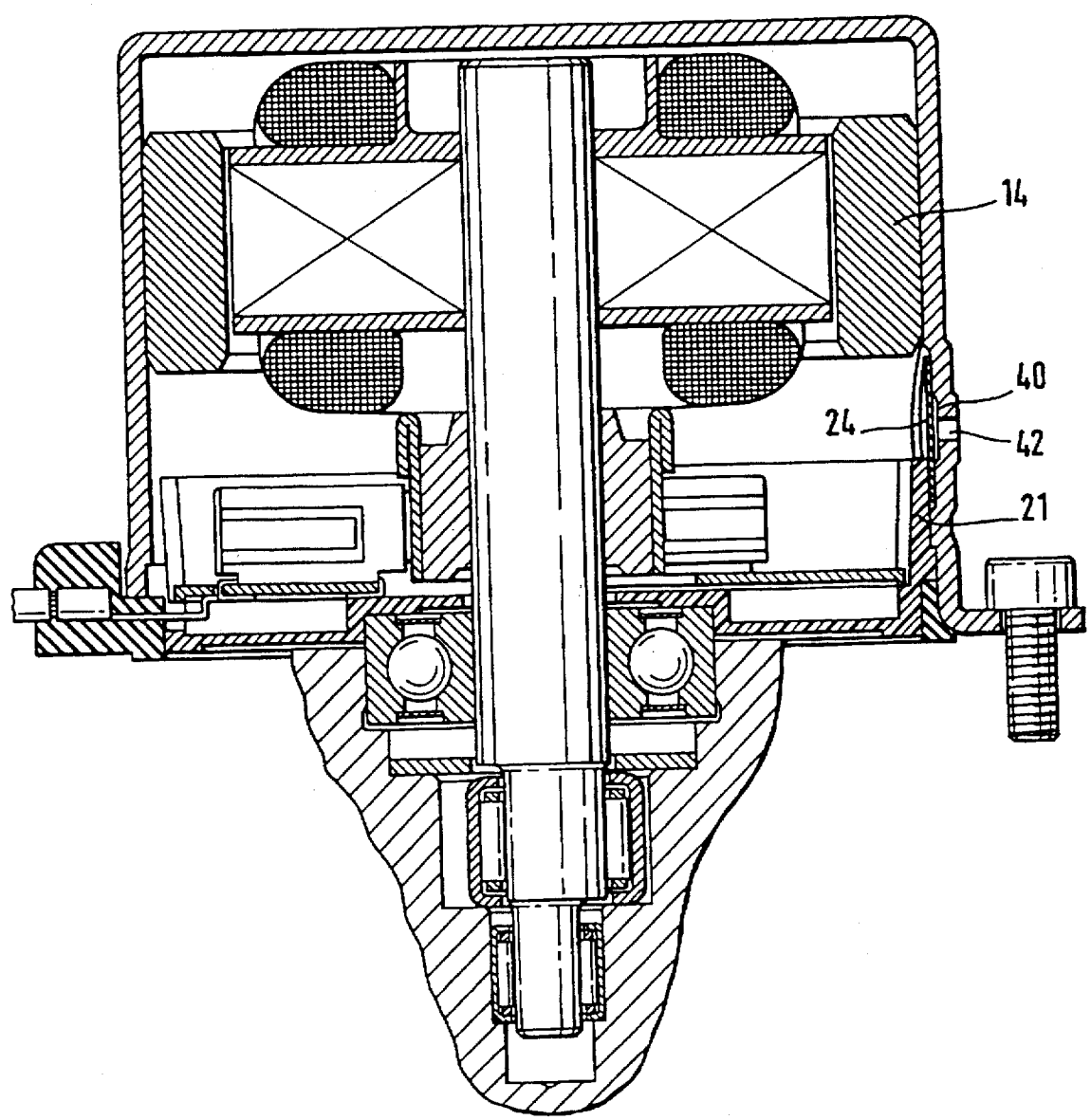
FIG. 5 is a cross-section view of a fifth embodiment of the motor of the present invention wherein a shield serves as an element for securing a membrane.

FIG. 5 shows an embodiment in which the shield 3 does not carry the entire membrane 24, but rather serves as an element for securing the membrane 24 that is fastened onto the inner wall of the housing 2. A depression 40 is provided in the inner wall of the housing for this purpose. This depression is formed by pressing the sheet metal of the housing 2 outward. The depression 40 is arranged within a region that lies between the magnet 14 and the edge of the housing.

A transverse bore 42 that connects the interior of the housing 2 with the external air ends in the depression 40. The membrane 24 is bonded into the depression 40. The collar 21 protrudes into the region of the depression 40 such that the upper edge of the collar 21 serves as a holding element for the membrane 24. This region presses part of the outer edge of the membrane 24 against the inner wall of the housing 2.

Figure 6:
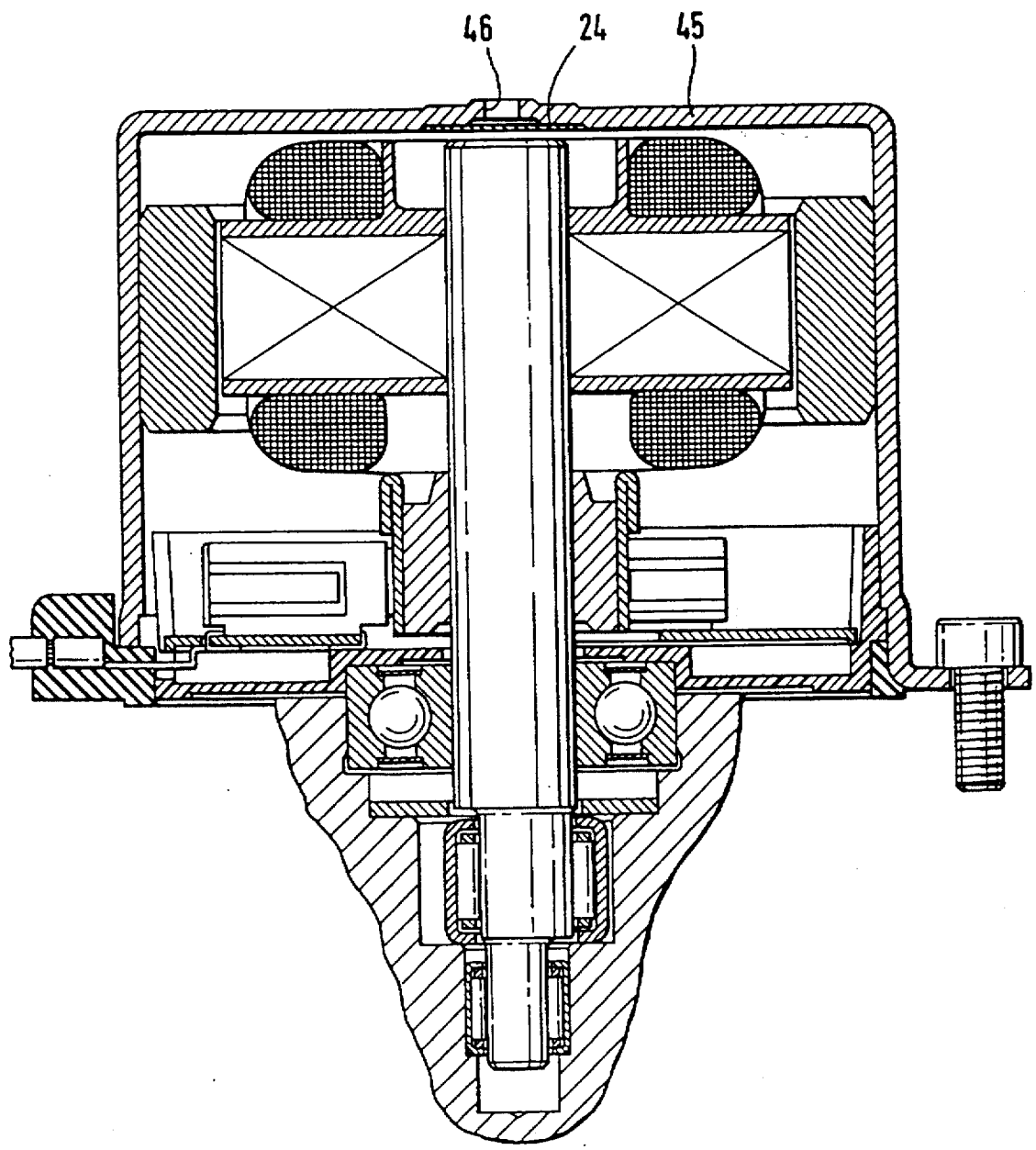
FIG. 6 is a cross-section view of a sixth embodiment of the motor of the present invention wherein a membrane is disposed in a central region of the base of the motor housing.

One fastening point for the membrane 24, at which the membrane is also well protected against external influences, lies within the central region of the base 45 of the housing 2. This arrangement is illustrated in FIG. 6. A depression produced by pressing the base sheet metal outward is provided in the center of the base 45. The membrane 24 is bonded into this depression. A bore 46 provided within the central region of the depression produces the connection with the outside.

We claim:

1. Electric motor for driving a hydraulic pump, in particular, for a brake system in motor vehicles, comprising:

a pot-shaped housing having an open end, a shield inserted into said open end, wherein the motor shaft extends from the housing through the aforementioned shield, and wherein an essentially flat side of the shield is attached to a flange surface of the housing of the pump to be driven in fluid-tight fashion, wherein the shield carries a membrane, said membrane being arranged in a connecting channel between the interior of the motor housing and the external air wherein the shield consists of a flat region that extends perpendicularly to the motor shaft and an axially extending collar, the outer edge of which adjoins the inner edge of the pot-shaped housing wherein the membrane is arranged within the collar region, and wherein a slot is provided on the outer edge of the collar, with said slot being covered by the housing and forming part of the connecting channel.

2. Electric motor according to claim 1, wherein at least part of the connecting channel is arranged in the shield.

3. Electric motor according to claim 1, wherein a circumferential seal provided within a region between the edge of the pot-shaped housing and the shield, wherein a portion of said connecting channel extends through the seal.

4. Electric motor according to claim 3, wherein the membrane is arranged within the flat region, and wherein a channel extends between the outer edge of the flat region and a channel in the seal.

5. Electric motor according to claim 1, wherein the membrane is arranged directly on the inner side of the pot-shaped housing, and wherein at least a partial region of the shield holds the membrane on the housing wall.

6. Electric motor according to claim 1, wherein the membrane is bonded onto the housing or the shield.

7. Electric motor according to claim 1, wherein the shield consists of plastic, and wherein the membrane is sprayed on during the manufacture of the shield such that the edge region of the membrane is rigidly and inseparably connected to the shield.

8. Electric motor according to claim 1, wherein the membrane is arranged in a capsule that can be inserted into a depression in the shield.

9. Electric motor according to claim 8, wherein the capsule consists of first and second parts that can be connected to one another, wherein the membrane is clamped between the first and second parts of the capsule.

10. Electric motor according to claim 8, wherein the capsule consists of first and second parts that can be connected to one another, wherein the membrane is clamped between the first and second parts of the capsule.

11. Electric motor for driving a hydraulic pump, in particular, for a brake system in motor vehicles, comprising:

a pot-shaped housing having an open end, a shield inserted into said open end, wherein the motor shaft extends from the housing through the aforementioned shield, and wherein an essentially flat side of the shield is attached to a flange surface of the housing of the pump to be driven in fluid-tight fashion, wherein the shield carries a membrane, said membrane being arranged in a connecting channel between the interior of the motor housing and the external air wherein the membrane is arranged directly on the inner side of the pot-shaped housing, and wherein at least a partial region of the shield holds the membrane on the housing wall.

12. Electric motor according to claim 11, wherein the membrane is bonded onto the housing or the shield.

13. Electric motor according to claim 11, wherein the shield consists of plastic, and wherein the membrane is sprayed on during the manufacture of the shield such that the edge region of the membrane is rigidly and inseparably connected to the shield.

14. Electric motor according to claim 11, wherein the membrane is arranged in a capsule that can be inserted into a depression in the shield.

15. Electric motor for driving a hydraulic pump, in particular, for a brake system in motor vehicles, comprising:

a pot-shaped housing having an open end, a shield inserted into said open end, wherein the motor shaft extends from the housing through the aforementioned shield, and wherein an essentially flat side of the shield is attached to a flange surface of the housing of the pump to be driven in fluid-tight fashion, wherein the shield carries a membrane, said membrane being arranged in a connecting channel between the interior of the motor housing and the external air wherein the shield consists of plastic, and wherein the membrane is sprayed on during the manufacture of the shield such that the edge region of the membrane is rigidly and inseparably connected to the shield.

16. Electric motor according to claim 15, wherein the membrane is arranged in a capsule that can be inserted into a depression in the shield.

17. Electric motor according to claim 16, wherein the capsule consists of first and second parts that can be connected to one another, wherein the membrane is clamped between the first and second parts of the capsule.

* * * * *